United States Patent [19]

Turnquist

[11] 4,193,210

[45] Mar. 18, 1980

[54] AUTOMATIC MEMORY TRAINER

[76] Inventor: Peter Turnquist, 24400 Geyserville Ave., Cloverdale, Calif. 95425

[21] Appl. No.: 929,688

[22] Filed: Jul. 31, 1978

Related U.S. Application Data

[63] Continuation-in-part of Ser. No. 828,853, Aug. 29, 1977, abandoned, which is a continuation of Ser. No. 624,272, Oct. 20, 1975, abandoned.

[51] Int. Cl.² ............................................. G09B 7/04
[52] U.S. Cl. .................................................... 35/9 A
[58] Field of Search ................... 35/6, 8 R, 9 R, 9 A, 35/9 B, 9 C, 14, 35 C, 48 R; 364/200 MS File, 900 MS File

[56] References Cited

U.S. PATENT DOCUMENTS

| | | | |
|---|---|---|---|
| 3,154,862 | 11/1964 | Culpepper, Jr. | 35/9 R |
| 3,408,749 | 11/1968 | Brudner | 35/9 A |
| 3,460,270 | 8/1969 | Butz et al. | 35/6 |
| 3,733,717 | 5/1973 | Montgomery et al. | 35/9 A |
| 3,964,177 | 6/1976 | Wright | 35/9 C |

OTHER PUBLICATIONS

Braun, P.; *APL Program: Mathdrill*, Division of Educational Research Services; Univ. of Alberta; pp. 1-12.
*Teacher's Handbook, 2000c/2000f Mathematics Drill and Practice Program*, Hewlett-Packard, 1972.

*Primary Examiner*—Vance Y. Hum
*Attorney, Agent, or Firm*—Freilich, Hornbaker, Wasserman, Rosen & Fernandez

[57] ABSTRACT

An automatic memory-trainer presenting problems to a trainee in a sequence controlled by the trainee's success in answering correctly. The sequence adapts itself to concentrate practice on those facts with which the trainee is having greater difficulty. Repetitive practice is such that difficult problems are interspersed with easier ones in a manner planned to continually test and expand the trainee's ability to recall the difficult facts.

32 Claims, 5 Drawing Figures

PRIORITY CONFLICT RESOLVER 4,193,210

1

AUTOMATIC MEMORY TRAINER

BACKGROUND OF THE INVENTION

This is a continuation-in-part of an application of the same inventor, Ser. No. 828,853, filed Aug. 29, 1977, now abandoned, which itself was a continuation of a parent application of the same inventor, Ser. No. 624,272, now abandoned, filed Oct. 20, 1975.

The invention relates in general to teaching machines and, in particular, to machines which improve and train one's memory by determining from a trainee's responses which facts he has difficulty remembering and directing him to exercise more intensively in recalling those facts.

Operation of the memory of animals (including humans) may be described as follows. The initial step in memory development is made when the mind is exposed to an intelligible fact. Such facts may include, for instance, foreign language vocabularies, multiplication and arithmetic tables, recipes, Morse or shorthand codes, word spelling, and mathematical or scientific formulas. Subsequent retention of the fact in the animal's memory is strengthened by exercising the mind to recall or reproduce the fact. For example, one may repeat his new telephone number many times in order to memorize it. Common experiences of this type indicate that prolonging conscious awareness of a fact tends to strengthen the impression of the fact on the subconscious memory. But even after the impression is so strengthened, an interval of time occupied by too much distraction will result in later inability to recall the fact. Naturally this difficulty is even greater when the objective is to memorize a large set of facts.

On the other hand, if a trainee devotes a period of time exclusively to the memorization of a set of facts, the efficiency of his efforts can be improved by systematic control of the sequence in which the facts are practiced. Considering that memory is a subconscious aspect of the mind and that genuine recall from memory may be regarded as a transfer of information from the subconscious to the conscious mind, it is desirable to induce the transfer of a fact from the subconscious to the conscious as a means of memory training. By comparison, if the trainee reproduces a single fact in unbroken repetition as in the previous example of memorizing a new telephone number, he continuously maintains conscious awareness of the fact and there is no exercise of genuine recall. Therefore, more efficient memory training entails an element of distraction to displace a fact from the conscious mind in order that, afterward, recall of the fact from the subconscious can be induced. At the same time, distraction must be limited below the level at which the ability to recall would be extinguished.

As one cannot deliberately control transfer of information between the conscious and subconscious portions of one's mind, an influence external from the trainee is required to intersperse distractions and inducements to recall. Moreover, the distraction interval itself preferably should consist of practice in recalling from memory other facts, all of which require similar treatment by way of postponed inducements to recall. It becomes desirable, therefore, that the sequencing of facts to be practiced by the trainee should include a system of variable priorities which shift according to the trainee's success in recalling each fact. It is an object of the present invention to define a sequencing process which (1) meets the training requirements outlined above, and (2) is precise, thereby enabling it to be mechanized.

SUMMARY OF THE INVENTION

The present invention functions as a personal tutor of relatively simple but numerous facts. It determines from the trainee's responses which facts he has difficulty remembering and directs him to exercise more intensively in recalling those particular facts.

In accordance with the illustrative embodiment, an address counter is used to access data items from a fact memory in a predefined sequence. The accessed problems are presented through output means to the trainee. The trainee in turn generates a response and a classification means determines whether the response is incorrect. If the response is incorrect, the corresponding fact is made subject to priority sequencing until the trainee demonstrates knowledge of the fact by correct response after a substantial distraction interval. The priority sequencer interrupts the predefined data sequence as required to create desirable intervals between repetitions of each priority problem. To make it easy for the trainee to exercise genuine recall on the first priority presentation of a problem, such presentation is made after the shortest possible distraction interval which is one other problem. Thereafter, the distraction interval gradually is increased as long as the trainee makes correct responses, but it is shortened again if the trainee makes another incorrect response.

The process of sequencing facts for this purpose entails multiple priorities which necessarily will vary with each trainee's answer history. Because the trainee's answer pattern is unpredictable, conflicts of priority duly arise and are resolved. All of this is reduced in the present invention to elementary steps of a mechanical nature. The result is an automatic tutor which functions better than a human tutor in matters of rote, because it is tireless and rigidly systematic.

The novel features of the invention are set forth with particularity in the appended claims. The invention will best be understood from the following description when read in conjunction with the accompanying drawings.

DESCRIPTION OF THE ILLUSTRATIVE EMBODIMENT

Figure 1:
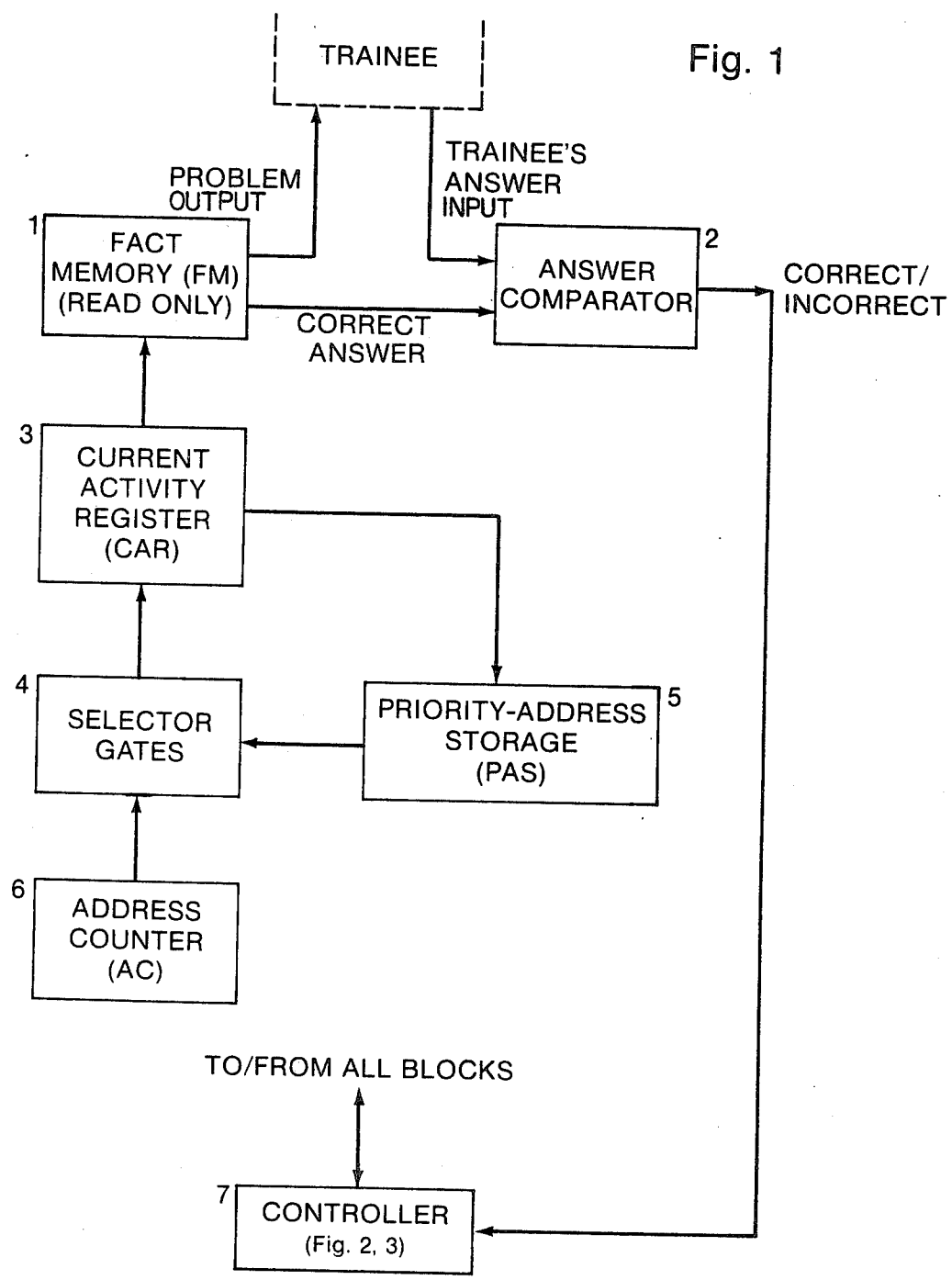
FIG. 1 is a simple block diagram of the entire apparatus.

Attention is now directed to FIG. 1, wherein a representative organization of the present invention is shown in terms of its information flow and storage. A Fact Memory (FM) 1 stores whatever list of facts a trainee is expected to memorize. In accordance with the invention, a fact can be defined as information which is expressible in the form of: (1) a problem or question together with (2) a correct answer or response. Each cell in FM 1 therefore holds but a single fact having two components—a problem and the correct answer thereto. The quantity of facts stored in FM 1 need not necessarily be static; rather, depending upon the invention's application, it may be desirable to store a list of facts of variable length and/or multiple fact classifications. In addition, the length of the lists stored in FM 1 and even the rotation of practice among the lists may be adapted and varied according to the individual progress of the trainee.

In the illustrative embodiment, an addressable, read-only Fact Memory is contemplated. Consideration also could be given to cost or performance advantages of other types of memories, for example: a read/write memory or a fixed-sequence memory.

A cell of the Fact Memory (FM) 1 is addressed from a Current Activity Register (CAR) 3, the contents of which includes a single address of FM 1. (Selection of the appropriate memory address for the CAR 3 will be discussed below.) After a fact stored in FM 1 has been addressed from the CAR 3, the problem, which is one component of the fact, is transmitted from FM 1, via appropriate data output means such as a digital display unit, to the trainee. The other component of the fact, the correct answer to that problem, is sent from FM 1 directly to an Answer Comparator unit 2. Upon submission of the problem, the trainee enters a response via appropriate data input means such as a keyboard unit connected to the Answer Comparator 2. Once the trainee's response has been received by the Answer Comparator 2, the unit ascertains whether the response is accurate by comparing it with the correct answer supplied directly from FM 1. The results obtained by the Answer Comparator 2 are transmitted to a Controller unit 7, which performs control functions for the other elements of the invention depicted in FIG. 1. The trainee is notified as to whether the response was correct. If the trainee's response was inaccurate, the correct answer may be supplied to him from the Fact Memory 1. In any event, the trainee is required to enter the correct answer before the next problem is presented.

When the trainee indicates by incorrect response that he doesn't know the fact currently selected by the address in the CAR 3, the Controller 7 classifies the fact as a priority item to be re-selected after a certain interval during which one or more different facts are interposed. (The control of this interval is discussed in detail below.) This classification is accomplished by transferring into a Priority-Address Storage (PAS) unit 5 the contents of the CAR 3 comprising the fact address and its status.

The source of the next address to be transferred into the CAR 3 is determined by Selector Gates 4 operated by the Controller 7. If there is a priority fact due for selection because the desired interval has elapsed since its previous selection, its address is transferred from PAS 5 to the CAR 3. But if the desired interval before re-use of a priority address has not yet elapsed, or if PAS 5 is empty because the trainee's answers have been uniformly correct, then the Selector Gates 4 connecting the CAR 3 to the Address Counter 6 are enabled instead. The Address Counter is incremented each time an address is transferred from it.

As the foregoing suggests, the key to the operation of the present invention is control of address transfers into and out of Priority-Address Storage unit 5. In detailing this process, the intervals between repeated (priority) presentation of incorrectly-answered problems must be specified. To do so involves resolving a number of points including:

(1) the number of priority presentations of the same problem to be scheduled after the problem has been answered incorrectly, in the case where such priority presentations are answered correctly;

(2) the status of a problem when it has been answered incorrectly more than once;

(3) the number of different problems to be interposed in the first distraction interval after a problem has been answered incorrectly;

(4) whether and how much to graduate the intervals preceding priority presentations of the same problem; and (5) conflict between different problems having the same priority.

In resolving these points, it should be noted that there exists more than one solution. Indeed, design decisions turn on such factors as the capability of the trainee and the nature of the facts being taught. Therefore, it must be recognized that, in a sense, the choices made below are partly arbitrary.

As disclosed above, should the trainee respond incorrectly to a problem, he is informed of the correct answer before teaching proceeds. Since the trainee at that time will have the correct answer on his conscious mind, an immediate repetition of the problem without a distraction interval would merely bore the trainee with something of which he already is aware. To interpose one other problem before repeating the incorrectly-answered problem would represent the shortest possible distraction interval and would prevail upon the trainee's capability of recall from subconscious memory. Although recall after a longer distraction interval could produce a greater strengthening effect upon the trainee's memory, a too-long interval would forfeit any memorization achieved because it would extinguish the trainee's ability to recall the answer.

For present purposes, a tentative total of three priority presentations of a problem are scheduled after an incorrect answer, the first such presentation following the minimum interval consisting of but one other problem. Presuming correct answers are made upon priority presentations of the same problem, the separating intervals are gradually increased in order that the trainee's memory will be increasingly taxed and strengthened. Accordingly, the normal distraction intervals prior to the second and third priority presentations are respectively two and three other problems. Should a problem once again be answered incorrectly during one of the three priority presentations, the cycle of three presentations is re-initiated. Should a conflict arise with respect to priority, first preference is awarded to maintaining the interval of one other problem before a first, priority presentation; second preference is given to that address which has been waiting the longest in Priority-Address Storage 5; and other presentations are delayed accordingly. Although the resolution of priority conflicts sometimes might result in temporary aberrations from the planned graduation of distraction intervals between priority presentations of the same problem, the priority conflicts are not cyclic for they depend on the individual trainee's pattern of incorrect answers.

By having but one other problem comprising the distraction interval before an incorrectly-answered problem is repeated, the invention has been adapted to the most obtuse of trainees. If a trainee answers incorrectly each and every time, then practice will be limited automatically to just two facts being the minimum which can be presented with provision for genuine recall from memory. If one can be confident that a larger distraction interval between repeated problems would not extinguish the recall ability of the trainee, then the interval before the first priority presentation could be made larger. In the illustrative embodiment, however, it is better to assume the trainee to be relatively obtuse since the invention will automatically increase the distraction interval to accommodate the more adept trainee. The same reasoning underlies the preference of a one-problem, first distraction interval in cases of priority conflict; otherwise, one would risk completely extinguishing the trainee's ability to recall. The effect of adopting this preference is that every fact the trainee misses will become the subject of at least one exercise of genuine recall provided the Trainee can remember a fact for the time required to process one other fact. But if a trainee can't remember even one fact for such an interval, which might ordinarily be just a few seconds, then he first must develop recall ability by consciously devoting more attention to the particular fact (or concepts underlying that fact) before continuing with additional facts.

Having adopted sequencing criteria as described above, it becomes possible to determine the storage capacity required of the Priority-Address Storage (PAS) unit 5. For so long as priority selections of a fact are scheduled, information concerning the fact is preserved in the PAS unit 5. Obversely, the capacity of PAS 5 needs to be only great enough to accommodate those facts which currently are subject to priority selection as described herein. The maximum number of facts in priority status occurs when the trainee: (1) answers all new problems incorrectly; (2) maximizes the admission of new facts to the sequence by making two correct answers in succession to each priority problem which lengthens the interval for admission of new facts; but (3) makes the third answer to each priority problem incorrectly which prevents the priority status of any priority fact from being terminated. The number of facts admitted to the selection sequence under these conditions will be found when new fact addresses cease to be transferred to the CAR 3 from the Address Counter 6 because the Controller 7 is fully occupied with sequencing of the priority facts represented in PAS 5. Accordingly, the capacity requirement for PAS 5 in the illustrative embodiment is found to be four cells. An alternative embodiment choosing different sequencing criteria could yield a greater or smaller PAS; but it is a noteworthy advantage of the invention that a definable limit on the classification of difficult facts enables the storage requirement for such facts to be minimized, even though the classification of difficult facts is adaptive to trainee response and the total number of facts to be taught is unlimited.

The analysis establishing the PAS 5 capacity requirement for the illustrative embodiment appears in the table below. The H and P parameters used in the analysis are status parameters employed by the Controller 7 which will be explained subsequently. The table shows that, under the worst-case conditions described, the selection sequence becomes fully occupied with priority facts after four facts are admitted. One may observe that no new facts are admitted after the trainee gives his second incorrect answer to fact 1.

Table 1

| FM address of problem presented | trainee's answer | status codes attached to FM address in PAS after trainee's answer | | | | | | | |
|---|---|---|---|---|---|---|---|---|---|
| | | 1 | | 2 | | 3 | | 4 | |
| | | H | P | H | P | H | P | H | P |
| 1 | incorrect | 0 | 2 | | | | | | |
| 2 | incorrect | 0 | 1 | 0 | 2 | | | | |
| 1 | correct | 1 | 3 | 0 | 1 | | | | |
| 2 | correct | 1 | 2 | 1 | 3 | | | | |
| 3 | incorrect | 1 | 1 | 1 | 3 | 0 | 2 | | |
| 1 | correct | 2 | 4 | 1 | 2 | 0 | 1 | | |
| 3 | correct | 2 | 3 | 1 | 1 | 1 | 4 | | |
| 2 | correct | 2 | 2 | 2 | 4 | 1 | 3 | | |
| 4 | incorrect | 2 | 1 | 2 | 4 | 1 | 3 | 0 | 2 |
| 1 | incorrect | 0 | 2 | 2 | 4 | 1 | 3 | 0 | 1 |
| 4 | correct | 0 | 1 | 2 | 3 | 1 | 2 | 1 | 4 |
| 1 | correct | 1 | 4 | 2 | 2 | 1 | 1 | 1 | 3 |
| 3 | correct | 1 | 3 | 2 | 1 | 2 | 4 | 1 | 2 |
| 2 | incorrect | 1 | 3 | 0 | 2 | 2 | 4 | 1 | 1 |
| 4 | correct | 1 | 2 | 0 | 1 | 2 | 3 | 2 | 4 |
| 2 | correct | 1 | 1 | 1 | 4 | 2 | 2 | 2 | 3 |
| 1 | correct | 2 | 4 | 1 | 3 | 2 | 1 | 2 | 2 |
| 3 | incorrect | 2 | 4 | 1 | 3 | 0 | 2 | 2 | 1 |
| 4 | incorrect | 2 | 4 | 1 | 3 | 0 | 1 | 0 | 2 |
| 3 | correct | 2 | 3 | 1 | 2 | 1 | 4 | 0 | 1 |
| 4 | correct | 2 | 2 | 1 | 1 | 1 | 3 | 1 | 4 |

In sequencing priority facts, and to distinguish priority facts from non-priority facts, the Controller 7 in the illustrative embodiment operates on two status parameters. The appellations given to these parameters are History (H) and Priority (P). A P code for each priority fact indicates such fact's position in the selection schedule. P is variable, and H is one of the factors affecting P. H reflects the trainee's response history on a particular problem. An H and a P are associated with each priority fact.

Priority and History are employed in the format of the data words both in the Current Activity Register 3 and in each cell of Priority-Address Storage 5, establishing the word format in these elements of the structure as:

| FM address | H, 2 bits | P, 3 bits |
|---|---|---|

The reason for allocating 2 bits to H and 3 bits to P will soon appear.

Before data are transferred into Priority-Address Storage (PAS) 5, an available PAS cell must be found, i.e. a PAS cell not containing an address in priority status. It is convenient to use the P field to signify whether its PAS cell is available, by setting P=0 when its associated address is not in priority status. It has been shown above for the illustrative embodiment that four is the largest, possible quantity of active addresses in PAS. So four values of P are assigned to arrange the PAS addresses in the priority schedule, with P=1 assigned to the address whose priority selection is scheduled earliest. As five values of P have now been assigned, P requires a 3-bit field.

History (H) normally represents the number of successive, correct answers the trainee has given to the same problem on priority presentations. It has been determined above for the illustrative embodiment that the priority classification of a problem will be terminated if the trainee gives three correct answers in succession to the same problem. Therefore H has a maximum value of three and requires a 2-bit field. H=3 signifies exclusion of the associated address from the schedule of priority selections. If the trainee answers correctly at an address newly transferred from the Address Counter, there will be no priority classification so H=3 is appropriate for that address too.

The Controller 7 implements the following sequencing rules which have been developed above:
  A. Unless a priority fact is due for selection, the next address is taken from the Address Counter 6.
  B. Following an incorrect answer, the same problem is scheduled for three priority presentations after (normal) graduated intervals of one, two, then three other problems.
  C. In cases of priority conflict, adjustment of intervals is made according to the following preferences:
    1. The first preference is to maintain the interval of one other problem between an incorrect answer and the first priority presentation.
    2. The second preference is to use the address in Priority-Address Storage 5 which has been waiting for use the longest time.

Figure 2:
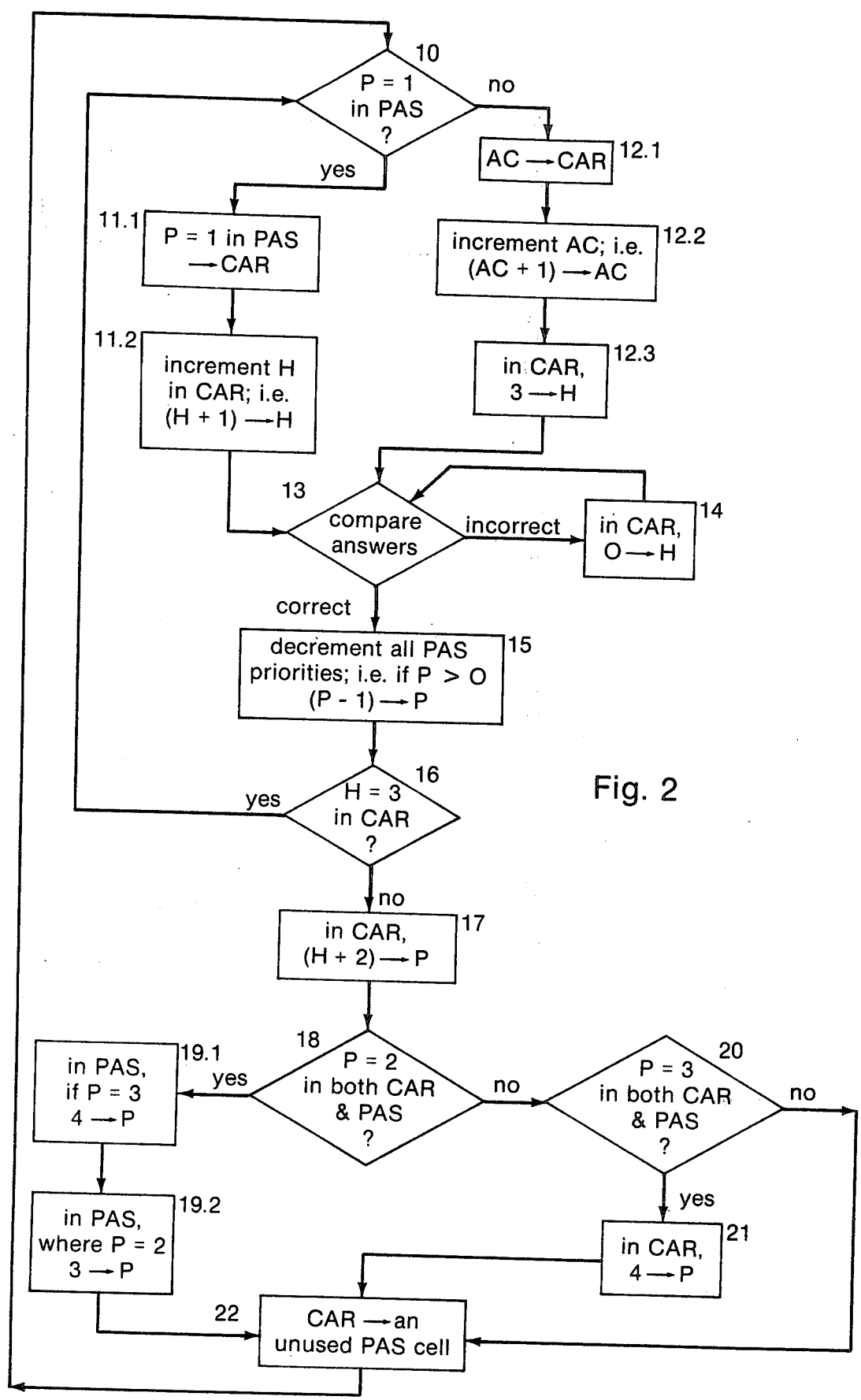
FIG. 2 is a flow chart defining the interaction of the elements of FIG. 1.

Attention is now directed to FIG. 2, which specifies the action of the Controller 7 in detail. FIG. 2 is a flow chart on which each block represents a simple arithmetic and/or logic operation which is performed in the paths indicated by the arrows. The reference numerals of FIG. 2 blocks are operation or path numbers.

Operation 10 is the decision whether to take the next fact address from the Address Counter 6 or from Priority-Address Storage (PAS) 5. No two words in PAS have the same Priority (P) value, except unused cells, if any, where P=0. A PAS word where P=1 is immediately due for priority selection, so Path 11 is followed. If P=1 does not exist in PAS, then the next address is taken from the Address Counter 6 (Path 12) even though there may be P's greater than 1 in PAS meaning that priority facts are scheduled for selection later.

Path 11, Operation 11.1. If a priority selection is due, the word having P=1 is transferred from Priority-Address Storage (PAS) 5 to the Current Activity Register (CAR) 3. The History (H) of this word is incremented (Operation 11.2) so it will have the proper value, signifying the number of correct answers on priority presentation, if the trainee answers correctly in Operation 13. Should the trainee answer incorrectly, Operation 14 overrides Operation 11.2.

Path 12. If it is determined in Operation 10 that no priority selection is due, the current value of the Address Counter (AC) 6 is transferred to the Current Activity Register (CAR) 3 (Operation 12.1), then the Address Counter (AC) is advanced to its next value (Operation 12.2). If the Address Counter was at its last address, it carries and commences anew from zero. When the Address Counter is the origin of the current address, the problem is newly presented without any answer in its recorded history. If the trainee answers correctly on this first presentation, then no priority presentations will be scheduled. This result is obtained by setting H=3 (Operation 12.3), the same as if priority status of the problem were being terminated after three correct answers. Should the trainee answer incorrectly, Operation 14 overrides Operation 12.3.

Operation 13. The trainee's answer is compared for identity with the correct answer supplied by the Fact Memory 1 from the address specified by the Current Activity Register 3. (The problem being answered resides at the same address.) If the trainee's answer is correct, Operation 15 will be initiated. But if the trainee's answer is incorrect, Operation 14 is initiated.

Operation 14. Upon an incorrect answer, the full series of three, priority selections is scheduled by setting H=0 in the Current Activity Register (CAR) 3. Return then to Operation 13 continues the original problem until the trainee succeeds in answering correctly with or without assistance; but H remains zero for that problem.

Operation 15. In this operation, which takes place upon completion of a problem presentation, all Priority (P) values in Priority-Address Storage (PAS) 5 are reduced by one, but not below zero since no use is made of negative priorities. This advances the sequence position of all the addresses in PAS 5—except where P changes from 1 to 0 which eliminates that address from PAS. But usually the elimination of an address in PAS by P going to 0 at this time is only transitory; because the same address is in the Current Activity Register 3, and it will be transferred back into PAS (Operation 22) with a P of 2 or greater (Operation 17) unless its H=3 (Operation 16) indicating that its series of priority presentations is complete. In view of Operation 11.1, P changing from 1 to 0 during Operation 15 means that the PAS cell where this change occurs is the source of the current address in the Current Activity Register; and no address is removed from the priority schedule until its H=3.

Operation 16. If the H value in the Current Activity Register (CAR) 3 is less than three, the current address is in priority classification, either because the trainee gave an incorrect answer in Operation 13 or because the trainee has not yet given three correct answers successively upon priority presentations. Priority selections are scheduled in Operations 17–22, culminating with transfer of the contents of the CAR 3 into Priority-Address Storage 5. If H=3 in the CAR, the CAR address is not in priority classification, either because the problem never was answered incorrectly or because priority classification has been terminated by the trainee's third correct answer. So if H=3, selection of a new address is initiated immediately by return to Operation 10.

Operation 17. It is helpful to view Priority (P) as a dependent variable, depending on the independent variable History. History (H) is independent in the sense that it is controlled outside the apparatus by the response of the trainee. Operation 17 gives P the value P=H+2. But after being so determined, P may be varied by one unit to resolve conflict with other priorities (Operations 18–21) and/or when the sequence position of all priority addresses is advanced (Operation 15). To illustrate the interaction of Priority (P) and History (H), consider the sequence in which the trainee gives one answer incorrectly at Address 1 and all others correctly. Table 2 below traces the H and P values associated with Address 1, which is the only address subject to priority scheduling. Observe how the formula P=H+2 relates to the graduation of intervals between priority selections of the same address. Each time a correct answer increases its History, the address awaits its next use through a longer subcycle of decrementing Priority. Use of 2 as the addend in Operation 17 results in the minimum interval of one other problem before the first priority-presentation.

Table 2

| FM address of problem presented | trainee's answer | controlling operations and resulting status of Address 1 | | | |
|---|---|---|---|---|---|
| | | Op. on H | H | Op. on P | P |
| 1 | incorrect | 14 | 0 | 17 | 2 |
| 2 | correct | — | 0 | 15 | 1 |
| 1 | " | 11.2 | 1 | 17 | 3 |
| 3 | " | — | 1 | 15 | 2 |
| 4 | " | — | 1 | 15 | 1 |
| 1 | " | 11.2 | 2 | 17 | 4 |
| 5 | " | — | 2 | 15 | 3 |
| 6 | " | — | 2 | 15 | 2 |
| 7 | " | — | 2 | 15 | 1 |
| 1 | " | 11.2 | 3 | 15 | 0 |
| 8 | " | — | — | — | 0 |

The above example avoids the complications of priority conflict and cycle truncation. Priority conflict occurs when P resulting from Operation 17 is equal in value to a P already in Priority-Address Storage, and such a conflict is resolved by Operations 18–21. Cycle truncation occurs when H is set to 0 (Operation 14) because of an incorrect answer at an address taken from Priority-Address Storage. Table 1 shows examples of priority conflict and cycle truncation, which cause deviation from the basic H and P cycles described in Table 2.

Operations 18–21. These operations resolve conflicts of priority, i.e. a P value in any Priority-Address Storage (PAS) 5 cell equal to the P value of a word about to be transferred into PAS from the Current Activity Register (CAR) 3. This resolution of priority conflict insures that all priority facts will have different values of P. Following Operation 15, the maximum value of P in PAS is P=3. Following Operation 17, the minimum value of P in the CAR is P=2. Therefore, priority conflict can occur only at P value 2 or 3.

Operation 18 and Path 19. Suppose that a conflict is found in Operation 18, at P=2. In the PAS word where P=2, H is greater than zero; because, if H were zero, Operation 17 would have made P=2 before the word arrived in PAS and Operation 15 then would have decremented P to 1. In the CAR word, $$H = P - 2 = 2 - 2 = 0$$

because the CAR word is the direct result of Operation 17 at this stage. H=0 in the CAR means that the CAR address is being scheduled for its first priority selection. As preference has been accorded to maintaining the minimum interval before the first priority selection, Path 19 resolves the conflict in favor of the CAR address by increasing P to 3 in the PAS word (Operation 19.2). If prior to Operation 19.1 there was a PAS word already having P=3, such P is increased to 4 to preserve the relative sequence of the PAS addresses.

Operations 20 and 21. Suppose next that conflict occurs at P=3. In this case, H is greater than 0 in the CAR as well as in the PAS word, so there is no preference on account of a first priority selection. The conflict is resolved by delaying the CAR address (Operation 21) because it was just used and the PAS address has been waiting a longer time for its turn.

Operation 22. Operations concerning the current fact having been completed, it is placed in the schedule of priority selections by transferring the contents of the Current Activity Register 3 to an available cell of Priority-Address Storage 5. Then selection of the next fact is initiated by return to Operation 10.

Figure 3:
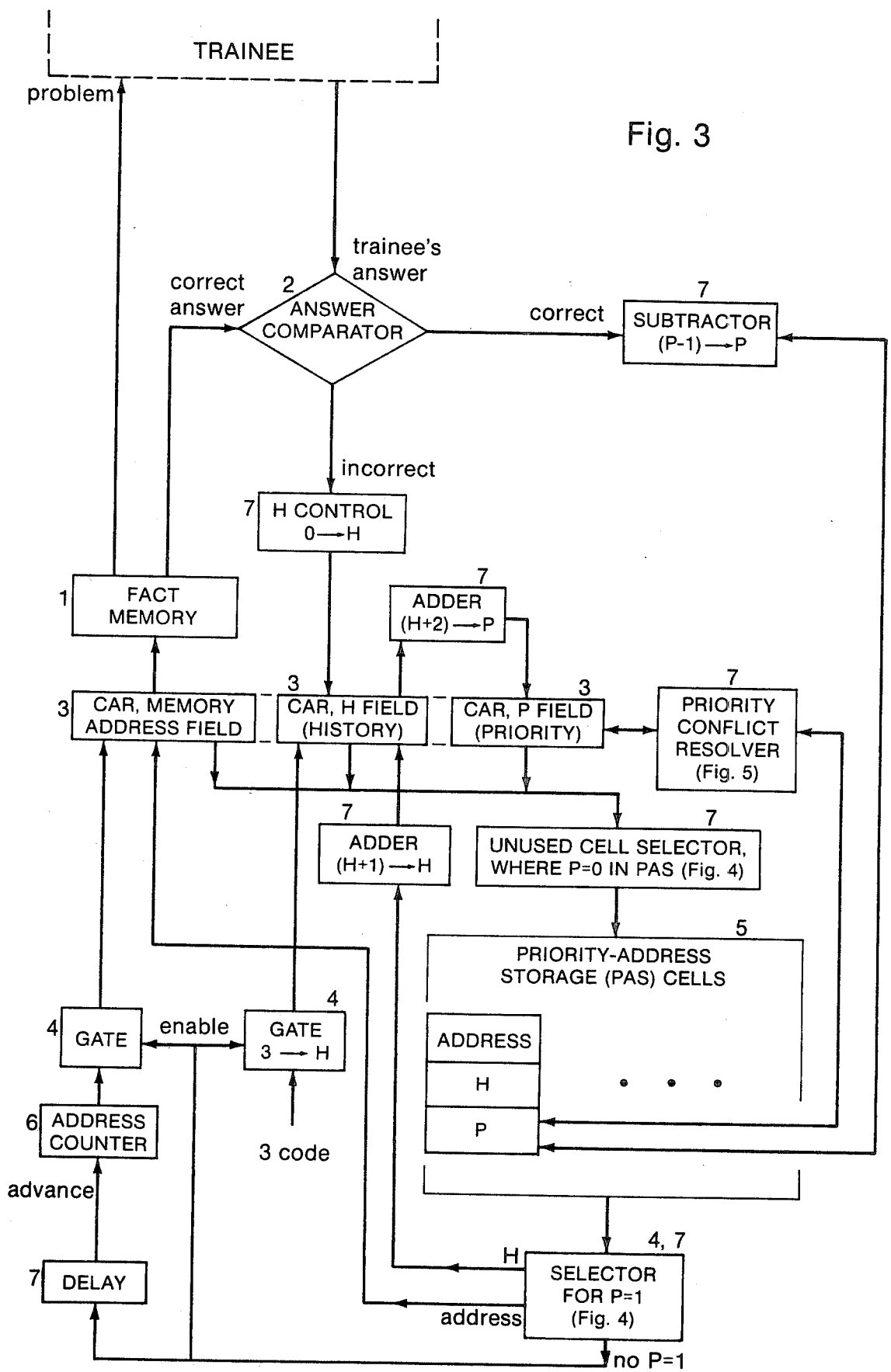
FIG. 3 is another block diagram of the entire apparatus, in greater detail than FIG. 1.

Attention is now directed to FIG. 3, which should be compared with FIG. 1 as both figures encompass the entire apparatus. FIG. 3 is more detailed, showing the subdivision of the Current Activity Register (CAR) 3 into fields. FIG. 3 also shows structural details of the Controller 7 whose operation has been explained fully in connection with the flowchart FIG. 2.

Figure 4:
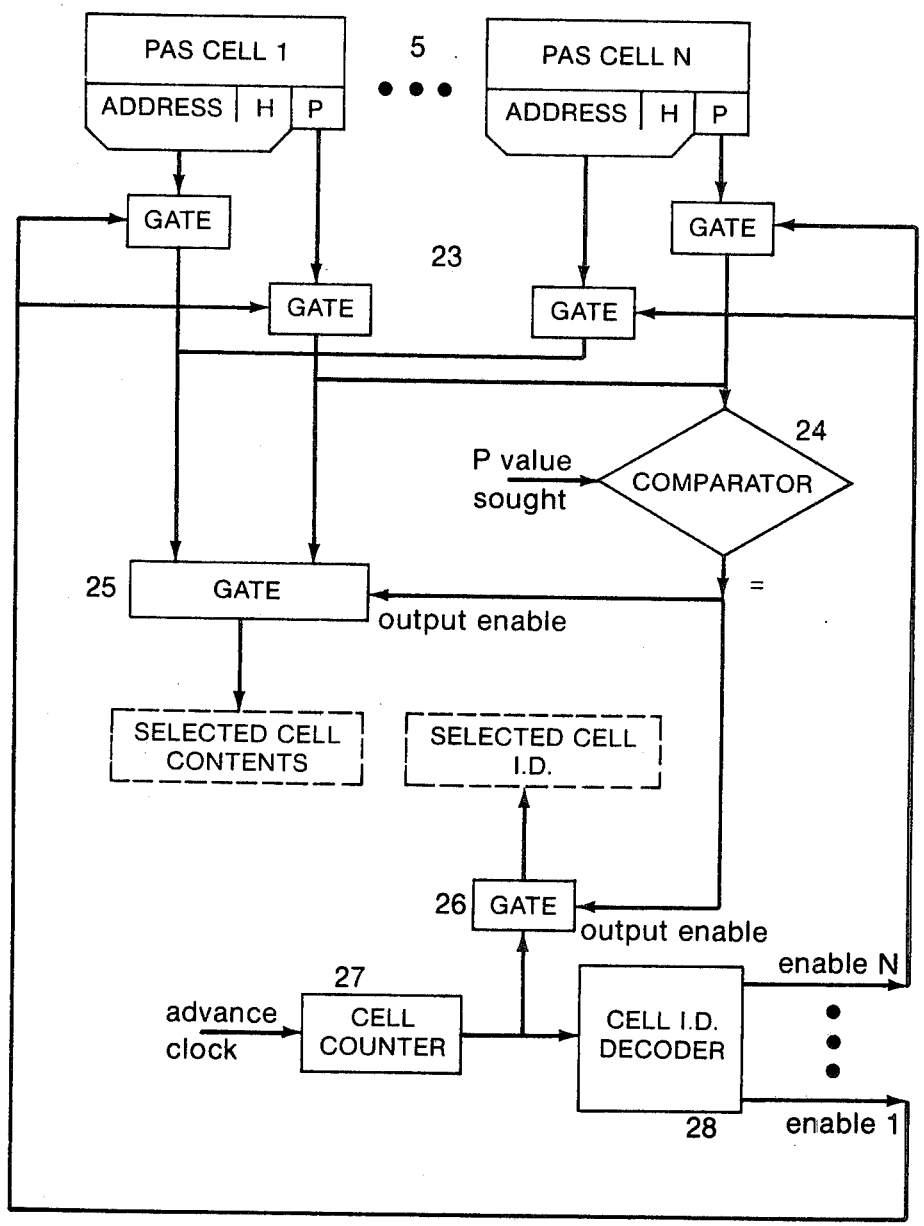
FIG. 4 is a detailed block diagram showing the structure of scanners used as the following parts of the apparatus, all of which are details of the Controller 7 of FIG. 1: the Unused Cell Selector and the Selector for P=1 of FIG. 3; and the PAS P-Value Scanner 29 in the Priority Conflict Resolver of FIGS. 3 and 5.

Attention now is directed to FIG. 4 which shows an exemplary apparatus for finding a word in Priority Address Storage (PAS) 5 having a given P value. As all priority facts have different P values after priority conflict resolution, a PAS cell may be identified by its P value. FIG. 4 represents further details of two of the elements of the Controller 7 shown in FIG. 3: the Unused Cell Selector, Where P=0 in PAS; and the Selector for P=1. The apparatus of FIG. 4 also is employed as element 29 of FIG. 5.

The FIG. 4 apparatus selects a PAS 5 cell according to its P value in the following manner. Each reading of a Cell Counter 27, which reading is converted to unitary code by a Cell I.D. Decoder 28, selects and identifies one cell of PAS. Interrogation of a PAS 5 cell is effected by enabling PAS output Gates 23 only for that cell selected by the Cell Counter 27. Another Gate 26, which outputs PAS cell identification, is enabled only when a Comparator 24 finds identity between the P value sought and the P value in the PAS cell selected by the Cell Counter 27. The contents of the selected PAS cell are output at the same time through another Gate 25. All PAS cells 5 are interrogated for P value as a clock advances the Cell Counter 27 through its cycle, but output of cell contents and identification occurs only if and when there is found a cell containing the P value sought.

Figure 5:
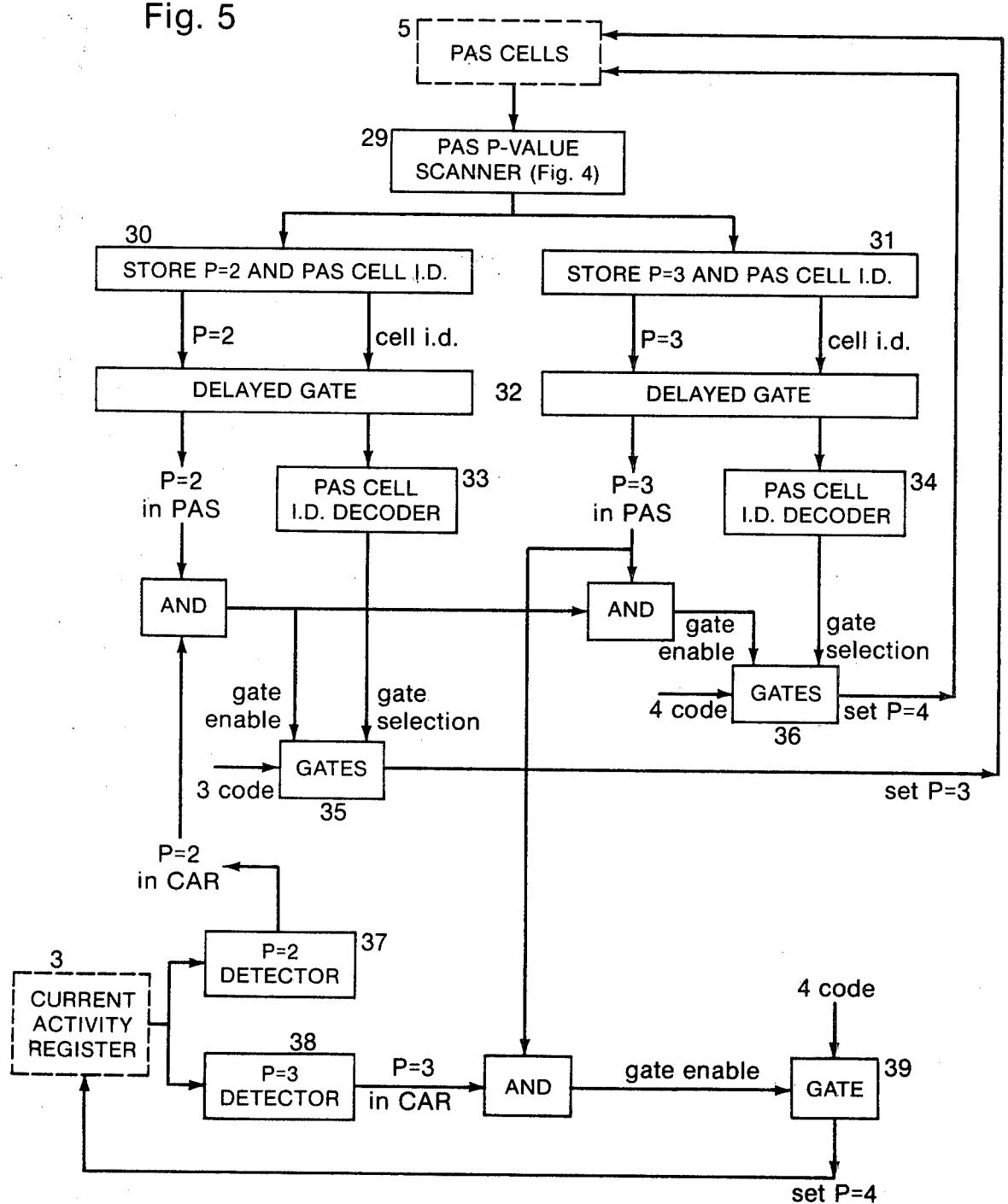
FIG. 5 is a detailed block diagram of the Priority Conflict Resolver shown in FIG. 3, which in turn is a detail of the Controller unit 7 of FIG. 1.

Attention is now directed to FIG. 5 wherein are shown structural details of the Priority Conflict Resolver (FIG. 3) which itself is a detail of the Controller 7. The structure of FIG. 5 implements Operations 18 through 21 of FIG. 2 as described above. As explained in connection with those operations, priority conflict occurs only if both:

(1) P=2 or P=3 in the Current Activity Register (CAR) 3; and (2) one of the Priority-Address Storage (PAS) 5 cells has the same P value as the CAR 3 has.

Therefore, resolution of priority conflict entails detectors (29, 30, 31, 37 and 38) for P=2 and P=3 in both PAS and the CAR. As to PAS, the detectors of P values and their locations include a scanning circuit 29 as described in FIG. 4 and the related text above. Delayed Gates 32 activate the logic for resolving conflict after the scanning of PAS is complete. If P=2 in both PAS and the CAR, the PAS Cell I.D. Decoder 33, identifying the PAS cell where P=2, selects a Gate 35 which enables resetting of P to 3 in that PAS cell. If P=2 in the CAR and both P=2 and P=3 occur in PAS, the PAS Cell I.D. Decoder 34, identifying the PAS cell where P=3, selects a Gate 36 which enables resetting of P to 4 in the PAS cell where P originally was 3; so that creation of a PAS priority conflict at P=3 is avoided. But if a priority conflict occurs because P=3 in both the CAR and PAS, then another Gate 39 is enabled to reset the CAR priority to 4 with no effect on PAS.

From the foregoing, it should now be apparent that an apparatus has been disclosed herein for facilitating the learning or memorizing of a set of facts by a trainee.

The apparatus in accordance with the invention presents problems in sequence to the trainee and elicits his response. If the response is incorrect, the sequential presentation is interrupted or modified to intersperse thereafter extra presentations of the problem associated with the incorrect response, the extra presentations occuring at deliberately controlled intervals.

Although particular embodiments of the invention have been described and illustrated herein, it is recognized that modifications and variations may readily occur to those skilled in the art and, consequently, it is intended that the claims be interpreted to cover such modifications and variations as well as to cover equivalent embodiments.

What is claimed is:

1. Apparatus useful by a trainee to facilitate learning, said apparatus comprising:
    memory means for storing a plurality of data items;
    first sequencing means for selecting data items from said memory means;
    additional sequencing means for making multiple selections of the same data item and separating successive selections of such item by an interval comprising one or more selections of other data items;
    interval variation means for automatically varying said interval from one predictable magnitude to another predictable magnitude;
    output means, responsive to each data item selected, for transmitting data, as defined by said selected data item, to a trainee;
    input means for receiving the trainee's response corresponding to the transmitted data; and
    classification means, responsive to the selected data and to the responses by the trainee, for determining whether responses by the trainee are good or bad and for classifying data items as subject to selection by said additional sequencing means.

2. The apparatus of claim 1 wherein said additional sequencing means is responsive to the detection of a bad response for again selecting that same data item after an interval of fixed, small magnitude.

3. The apparatus of claim 2 wherein said interval variation means includes means for increasing said interval when the trainee makes a good response.

4. The apparatus of claim 3 wherein said means for increasing said interval includes means for increasing the interval in a plurality of equal or unequal increments as the trainee makes a plurality of good responses corresponding to the same data item.

5. The apparatus of claim 1 wherein said interval variation means includes means for decreasing said interval when the trainee makes a bad response.

6. The apparatus of claim 5 wherein said interval variation means also includes means for increasing said interval when the trainee makes a good response.

7. The apparatus of claim 6 wherein said means for increasing said interval includes means for increasing the interval in a plurality of equal or unequal increments as the trainee makes a plurality of good responses corresponding to the same data item.

8. The apparatus of claim 1 wherein said interval variation means includes means for increasing said interval when the trainee makes a good response.

9. The apparatus of claim 8 wherein said means for increasing said interval includes means for increasing the interval in a plurality of equal or unequal increments as the trainee makes a plurality of good responses corresponding to the same data item.

10. The apparatus of claim 1 further including first storage means storing information defining the status of data items subject to selection by said addition sequencing means.

11. The apparatus of claim 10 wherein said status information includes the interval until selection of a data item by said additional sequencing means.

12. The apparatus of claim 11 wherein said status information also includes the quantity of good responses the trainee has given to the same data item.

13. The apparatus of claim 12 wherein said interval variation means is responsive to said status information stored by said first storage means.

14. The apparatus of claim 13 further including logic means responsive to said status information and capable of terminating the classification of a data item as subject to selection by said additional sequencing means.

15. The apparatus of claim 12 further including logic means responsive to said status information and capable of terminating the classification of a data item as subject to selection by said additional sequencing means.

16. The apparatus of claim 11 wherein said interval variation means is responsive to said status information stored by said first storage means.

17. The apparatus of claim 16 further including logic means responsive to said status information and capable of terminating the classification of a data item as subject to selection by said additional sequencing means.

18. The apparatus of claim 11 further including logic means responsive to said status information and capable of terminating the classification of a data item as subject to selection by said additional sequencing means.

19. The apparatus of claim 10 wherein said status information includes the quantity of good responses the trainee has given to the same data item.

20. The apparatus of claim 11 wherein said interval variation means is responsive to said status information stored by said first storage means.

21. The apparatus of claim 20 further including logic means responsive to said status information and capable of terminating the classification of a data item as subject to selection by said additional sequencing means.

22. The apparatus of claim 19 further including logic means responsive to said status information and capable of terminating the classification of a data item as subject to selection by said additional sequencing means.

23. The apparatus of claim 10 wherein said interval variation means is responsive to said status information stored by said first storage means.

24. The apparatus of claim 10 further including logic means responsive to said status information and capable of terminating the classification of a data item as subject to selection by said additional sequencing means.

25. The apparatus of any one of claims 1, 2 or 3–24, further including second storage means for identifying data subject to selection by said additional sequencing means.

26. The apparatus of claim 25, including control logic and wherein said second storage means comprises a plurality of units corresponding to a plurality of classified data items; and such plurality of second storage means, together with said control logic, constitute means for processing a plurality of data items simultaneously subject to selection by said additional sequencing means.

27. The apparatus of claim 26 wherein said second storage means has limited capacity corresponding to a known maximum quantity of data items subject to selection by said additional sequencing means, such maximum quantity being less than the total quantity of data items stored in said memory means.

28. The apparatus of claim 26 wherein a plurality of data items are subject to selection by said additional sequencing means; and
conflict resolution means for resolving selection conflicts between data items by delaying the selection of one or more data items.

29. Apparatus useful by a trainee to facilitate learning, said apparatus comprising
memory means storing a plurality of individually addressable data items;
output means responsive to each data item supplied thereto for presenting data to a trainee as defined by said data item;
first addressing means for accessing said memory means and supplying said data items to said output means in a predefined sequence;
input means for enabling a trainee to generate a response corresponding to each data presentation;
monitoring means responsive to each data item supplied to said output means for determining whether the corresponding response generated is incorrect;
second addressing means responsive to said monitoring means determining a response is incorrect for interrupting the sequence of data items supplied by said first addressing means to instead supply the data item corresponding to said incorrect response to said output means, said second addressing means including logic means for producing n interruptions of said sequence, said interruptions occurring at increasingly longer intervals; and means for providing said increasingly longer intervals.

30. The apparatus of claim 29 wherein said second addressing means includes an address storage means and further including:
means responsive to said monitoring means determining a response is incorrect for storing an address in said address storage means identifying the data item corresponding to said incorrect response.

31. The apparatus of claim 30 further including means for storing a priority parameter value with respect to each address stored in said address storage means;
means for varying said priority parameter values in response to each data presentation by said output means; and
means responsive to a priority parameter having a certain predetermined value for causing said second addressing means to supply the data item identified by the stored address associated with that priority parameter to said output means.

32. The apparatus of claim 30 further including means for storing an historical parameter value with respect to each address stored in said address storage means;
means for varying said historical parameter value each time the data item identified by the stored address associated with that historical parameter is supplied to said output means; and
means responsive to an historical parameter having a certain predetermined value for deleting the associated address from said storage means.

* * * * *